Patented Nov. 3, 1936

2,059,195

UNITED STATES PATENT OFFICE 2,059,195

ARYL MERCURY AROMATIC CARBOXYLATES

Carl N. Andersen, Watertown, Mass., assignor to Lever Brothers Company, a corporation of Maine No Drawing. Application January 9, 1935, Serial No. 966

13 Claims. (Cl. 260—13)

The present invention relates to the production of certain new organic mercury compounds, and more particularly to aromatic mercury salts of oxy-substituted aromatic mononuclear carboxylic acids.

It is an object of my invention to produce new organic mercury compounds useful as germicides and for other therapeutic purposes.

I have discovered that when the hydrogen atom of the carboxyl group of oxy-substituted aromatic mononuclear acids is replaced by the essential radical of certain aromatic mercury compounds, compounds are produced which have extraordinarily high potency as antiseptics and germicides and at the same time are characterized by relatively low toxicity and other desirable properties.

The compounds I have produced may be described as having a general formula $RHg.R_1$, in which R represents an aromatic structure, to a carbon atom of which the mercury is directly attached; and in which $R_1$ represents an oxy-substituted aromatic mononuclear carboxylic acid radical that is linked to the RHg group through the replacement of the hydrogen atom of the carboxyl group.

More particularly, R represents an aromatic structure, which may be an aromatic nucleus with or without side chains, and the expression "aromatic structure" used herein is intended to be generic and include an aromatic nucleus with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl and naphthyl groups.

The radical $R_1$ represents a radical corresponding to an aromatic mononuclear compound which contains a COOH group and in which one or more of the hydrogens attached to nuclear carbon atoms have been substituted by an oxy group. The substituted group may be any group which is linked to the nuclear carbon atom through oxygen, for example, the hydroxy, methoxy, ethoxy, acetyloxy groups, etc. More than one of the hydrogens of the ring may be replaced by the same or by different oxy groups or they may be replaced by one or more oxy groups and one or more of some other group, for example, any monovalent radical. Sulphur is similar to oxygen and the substituted groups may contain sulphur in a position corresponding to that of oxygen.

The following examples illustrate the types of acids falling within the above defined class and from which aromatic mercury derivatives comprising my invention may be prepared:

Salicylic acid,
Para-hydroxy benzoic acid,
Protocatechuic acid (3,4-dihydroxy benzoic acid),
Gallic acid,
Anisic acid (para-methoxy benzoic acid),
Resorcylic acid (2,4-dihydroxy benzoic acid),
Thiosalicylic acid, $(HS.C_6H_4.COOH)$,
Sodium sulfosalicylic acid, $(SO_3Na.C_6H_3.OH.COOH)$, Acetyl salicylic acid,
Syringic acid (3,5-dimethoxy 4-hydroxy benzoic acid),
Cresotinic acid (2-methyl 3-hydroxy benzoic acid),
5-phenyl salicylic acid,
3-phenyl salicylic acid, and
Meta-hydroxy benzoic acid.

I have prepared organic mercury salts corresponding to all of the above noted oxy-substituted acids. These compounds, together with others I have investigated, comprise a sufficiently representative number of the mononuclear oxy-substituted acids containing at least one oxy group to lead me to believe that all of the acids of this general group can be employed to produce my novel mercury compounds. The compounds so prepared have in greater or lesser, but always in relatively high degree, desirable antiseptic and germicidal properties. I therefore regard my invention as generic to and including the entire group of oxy-substituted acids of the above defined type.

The general method of producing these compounds consists in reacting together an oxy-substituted acid and a compound containing an aromatic mercury radical of the above mentioned type. A common solvent for both reacting components is employed. The compound resulting from the reaction is usually relatively insoluble as compared with the reacting components, and upon its precipitation may be filtered, washed and dried. In my application Serial No. 694,198, filed October 18, 1933, I have disclosed a general method of preparing aromatic mercury compounds of this type by reacting an acidic compound with an aromatic mercury hydroxide. This reaction is one of neutralization of an acid and base to form a salt and water. This has the advantage that water is the only other product produced and the resulting compound may be easily purified. In my application Serial No.

694,199, filed October 18, 1933, I have disclosed another general method of preparing aromatic mercury compounds of this type by employing a soluble aromatic mercury salt, for example, the acetate or the lactate, in a reaction with the acidic compound. The aromatic mercury compounds produced are of a relatively low solubility as compared with the aromatic mercury salt and are relatively insoluble as compared with the acidic compound. Either of these general methods may be employed in producing the compounds comprising this invention. In this reaction the substituted groups do not enter into the reaction and the structure of the compound remains the same except for the replacement of the acidic hydrogen.

The following examples are given as illustrative of a method by which all of the compounds of this group may be prepared, and as illustrative of representative organic mercury derivatives falling within the scope of my invention:

Example 1

2.94 grams of phenylmercury hydroxide is dissolved in 1 liter of water and heated until solution is complete. The solution is filtered to remove any gum or insoluble material. To the filtrate is added 1.51 grams of salicylic acid dissolved in 100 cc. of water. A precipitate results and the mixture is allowed to stand and cool, after which the precipitate is separated by filtration, washed well with warm water and dried. It has a melting point of 158° C. The compound is phenylmercury salicylate.

Example 2

17.64 grams of phenylmercury hydroxide is dissolved in 4 liters of water and heated until solution is complete. The solution is filtered to remove any insoluble material. To the filtrate is added an aqueous solution containing 12.4 grams of gallic acid. A greenish yellow precipitate results and the mixture is allowed to stand for some time in a dark closet. The precipitate is separated by filtration, washed well with warm water and dried. Upon heating the material an increase in the greenish color is noted and it finally decomposes. The compound is phenylmercury gallate.

Example 3

17.64 grams of phenylmercury hydroxide is dissolved in 4 liters of water and heated until solution is complete. The solution is filtered to remove any insoluble material. To the filtrate is added 10.03 grams of anisic acid in aqueous solution. A white precipitate separates on cooling and the mixture is allowed to stand after which it is filtered. The precipitate is washed well with warm water and dried. It melts at 119–127° C., and upon re-crystallization from alcohol has a melting point of 132–133°. The compound is phenylmercury anisate.

Example 4

17.64 grams of phenylmercury hydroxide is dissolved in 4 liters of water and heated until solution is complete. The solution is filtered to remove any insoluble material. To the filtrate is added 5.08 grams of thiosalicylic acid dissolved in 300 cc. of alcohol. A precipitate results and the mixture is allowed to stand and cool, after which it is filtered. The precipitate is washed well with warm water and dried. It decomposes slowly over 200° C. The compound is phenylmercury thiosalicylate.

Example 5

40 grams of phenylmercury acetate is dissolved in 2 liters of water and heated until solution is complete. The solution is filtered to remove any insoluble material. To this solution is added 11.88 grams of acetyl salicylic acid (aspirin) dissolved in 100 cc. of alcohol. A crystalline precipitate results. After allowing the mixture to stand and cool it is filtered. The precipitate is washed well with warm water and dried. Upon recrystallization from alcohol the material melts at 158–159° C., and is believed to be the compound phenylmercury acetyl salicylate.

The mixed melting point of this compound and the phenylmercury salicylate (Example 1) is 131–135° C., indicating that this compound is not identical with the phenylmercury salicylate.

Example 6

14.70 grams of phenylmercury hydroxide is dissolved in 2 liters of water and heated until solution is complete. The solution is filtered to remove any insoluble material. To the filtrate is added 10.89 grams of syringic acid dissolved in 75 cc. of alcohol. A milky solution results and a gum separates on the bottom. The mixture is allowed to stand until cool, after which it is filtered and the precipitate washed well with warm water and dried. Upon heating the material it softens at 100° C. and decomposes gradually upon further heating. The compound is phenylmercury syringate.

Example 7

20 grams of phenylmercury acetate is dissolved in 2 liters of water and heated until solution is complete. The solution is filtered to remove any insoluble material. To the filtrate is added an alcoholic solution containing 9.12 grams of ortho-cresotinic acid. A milky precipitate results and the mixture is allowed to stand and cool, after which it is filtered. The precipitate is washed well with warm water and alcohol and dried. It melts at 107–108° C. The compound is phenylmercury ortho-cresotinate.

The reacting materials are employed in substantially theoretical quantities. In some cases, if desired, approximately 10% excess of the acid is employed in order to insure the complete conversion of a phenylmercury compound.

Any suitable solvent in which the reacting components are soluble may be used as the medium for carrying out the reaction. If they are both soluble in water this is generally used for reasons of convenience, but if not, other solvents such as the alcohols or acetone or mixtures of these with each other or with water, may be employed. The process may be carried out at any temperature, for example, room temperature. In most cases I find, however, that the use of heat facilitates the solution of the reacting components and speeds the reaction.

From the description of the specific examples, it will be readily apparent to one skilled in the art how other members of the above identified group may be reacted with an aromatic mercury compound to produce the other mercury compounds of analogous structure which are within the scope of my invention.

All of the compounds produced as above described are characterized by extraordinarily high potency as germicides. Tests to determine their efficacy in killing *B. typhosus* and *Staph. aureus* were carried on under the following conditions:

Aqueous solutions of varying dilutions from 1:10,000 upward until killing ceased, were made up.

These dilutions were employed in the conduct of the tests by the following methods:

Circular 198, U. S. Dept. of Agriculture, Dec. 1931, described as F. D. A. method against *Eberthella typhi* (typhoid bacillus) at 37° C. and F. D. A. special method against *Staph. aureus* at 37° C.

As illustrative of the potency of the compounds, the killing power of the following compounds is given merely as illustrative.

The figures represent the maximum dilutions at which killing in 15 minutes resulted:

|  | B. typhosus | Staph. aureus |
|---|---|---|
| Phenylmercury salicylate | 1:70,000 | 1:25,000 |
| Phenylmercury anisate | 1:60,000 | 1:50,000 |
| Phenylmercury acetyl salicylate | 1:120,000 | 1:45,000 |
| Phenylmercury ortho-cresotinate | 1:80,000 | 1:40,000 |

In addition to their high germicidal value, all of these compounds are characterized by relatively low toxicity. Because of these properties it is possible to use them in extreme dilutions and in many situations where known germicides, because of toxic or other undesired properties, can not be employed. They may be used externally and locally, and in some cases adminstered internally with satisfactory results from the germicidal standpoint and without harmful effect to the body or its functions.

The compounds retain their germicidal activity when incorporated in soap and various menstruums employed in preparing germicidal compositions.

When these new compounds are to be used directly as germicides they may be employed in aqueous or other solutions or they may be formed into various preparations such as mouth washes, tooth pastes, soaps, ointments, etc.

This application is a continuation in part of my application Serial No. 694,207, filed October 18, 1933.

I claim:

1. A new organic compound of the general formula $RHg.R_1$, in which R represents an aromatic structure to a carbon atom of which the mercury is directly attached, and in which none of the carbon atoms has direct linkage with any element other than hydrogen, carbon and mercury; and in which $R_1$ represents an aromatic mononuclear carboxylic acid radical, in which at least one of the nuclear hydrogens has been replaced by an oxy group, which radical is linked to the RHg group through the replacement of the carboxylic hydrogen atom.

2. A new organic compound of the general formula $RHg.R_1$, in which R represents an aromatic structure to a carbon atom of which the mercury is directly attached, and in which none of the carbon atoms has direct linkage with any element other than hydrogen, carbon and mercury; and in which $R_1$ represents a substituted aromatic mononuclear carboxylic acid radical, a substituted group being linked to the nuclear carbon atom through oxygen, which radical is linked to the RHg group through the replacement of the carboxylic hydrogen atom.

3. A new organic compound of the general formula $RHg.R_1$, in which R represents an aromatic structure to a carbon atom of which the mercury is directly attached, and in which none of the carbon atoms has direct linkage with any element other than hydrogen, carbon and mercury; and in which $R_1$ represents a mononuclear alkyl oxy substituted carboxylic acid radical that is linked to the RHg group through the replacement of the carboxylic hydrogen atom.

4. A new organic compound of the general formula $RHg.R_1$, in which R represents an aromatic structure to a carbon atom of which the mercury is directly attached, and in which none of the carbon atoms has direct linkage with any element other than hydrogen, carbon and mercury; and in which $R_1$ represents a poly-substituted aromatic mononuclear carboxylic acid radical, one of the substituted groups being linked to the nuclear carbon atom through oxygen, which radical is linked to the RHg group through the replacement of the carboxylic hydrogen atom.

5. A new organic compound of the general formula $RHg.R_1$, in which R represents an aromatic structure to a carbon atom of which the mercury is directly attached, and in which none of the carbon atoms has direct linkage with any element other than hydrogen, carbon and mercury; and in which $R_1$ represents a poly-substituted aromatic mononuclear carboxylic acid radical, each of the substituted groups being different and one being the OH group, which radical is linked to the RHg group through the replacement of the carboxyl hydrogen atom.

6. A new organic compound of the general formula $C_6H_5Hg.R_1$, in which $R_1$ represents an aromatic mononuclear carboxylic acid radical, in which at least one of the nuclear hydrogens has been replaced by an oxy group, which radical is linked to the $C_6H_5Hg$ group through the replacement of the carboxylic hydrogen atom.

7. A new organic compound of the general formula $C_6H_5Hg.R_1$, in which $R_1$ represents a substituted aromatic mononuclear carboxylic acid radical, a substituted group being linked to the nuclear carbon atom through oxygen, which radical is linked to the $C_6H_5Hg$ group through the replacement of the carboxylic hydrogen atom.

8. A new organic compound of the general formula $C_6H_5Hg.R_1$, in which $R_1$ represents a mononuclear alkyl oxy substituted carboxylic acid radical that is linked to the $C_6H_5Hg$ group through the replacement of the carboxylic hydrogen atom.

9. A new organic compound of the general formula $C_6H_5Hg.R_1$, in which $R_1$ represents a poly-substituted aromatic mononuclear carboxylic acid radical, one of the substituted groups being linked to the nuclear carbon atom through oxygen, which radical is linked to the RHg group through the replacement of the carboxylic hydrogen atom.

10. A new organic compound of the general formula $C_6H_5Hg.R_1$, in which $R_1$ represents a poly-substituted aromatic mononuclear carboxylic acid radical, each of the substituted groups being different and one being the OH group, which radical is linked to the RHg group through the replacement of the carboxyl hydrogen atom.

11. Phenylmercury anisate.

12. Phenylmercury acetyl salicylate.

13. Phenylmercury ortho-cresotinate.

CARL N. ANDERSEN.